(12) United States Patent
Tchekneva et al.

(10) Patent No.: US 8,561,574 B2
(45) Date of Patent: Oct. 22, 2013

(54) COLLECTION STATION FOR ACCELERATED COLLECTION OF SPECIMENS FROM LABORATORY ANIMALS

(75) Inventors: Elena E. Tchekneva, Brentwood, TN (US); Mikhail M. Dikov, Brentwood, TN (US); Veronika Kadkina, Kazan (RU); Dina Polosukhina, Franklin, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 13/077,731

(22) Filed: Mar. 31, 2011

(65) Prior Publication Data

US 2011/0239953 A1  Oct. 6, 2011

Related U.S. Application Data

(60) Provisional application No. 61/319,714, filed on Mar. 31, 2010.

(51) Int. Cl.
*A01K 1/01* (2006.01)
*A01K 31/04* (2006.01)

(52) U.S. Cl.
USPC ........... 119/479; 119/417; 119/432; 119/442; 119/458

(58) Field of Classification Search
USPC ......... 119/417, 416, 419, 432, 441, 442, 443, 119/458, 462, 463, 472, 479, 480, 455, 452, 119/453, 459, 482, 487, 481, 501, 494, 161, 119/165, 530, 471, 509
See application file for complete search history.

(56) References Cited

U.S. PATENT DOCUMENTS

| | | | | |
|---|---|---|---|---|
| 5,452,681 A | * | 9/1995 | Ho | 119/498 |
| 5,803,018 A | * | 9/1998 | Liou | 119/461 |
| 5,996,536 A | * | 12/1999 | King | 119/459 |
| 6,058,886 A | * | 5/2000 | Haines | 119/601 |
| 6,832,580 B2 | * | 12/2004 | Marchioro | 119/452 |
| 7,059,274 B2 | * | 6/2006 | Cheng | 119/455 |
| 7,347,164 B2 | * | 3/2008 | Axelrod et al. | 119/499 |
| 7,380,520 B2 | * | 6/2008 | Migita | 119/479 |
| 7,827,939 B2 | * | 11/2010 | Yang | 119/461 |
| 7,827,940 B2 | * | 11/2010 | Silverman | 119/474 |
| 2005/0066909 A1 | * | 3/2005 | Gabriel et al. | 119/419 |
| 2005/0235923 A1 | * | 10/2005 | Niki | 119/479 |
| 2010/0282179 A1 | * | 11/2010 | Ho | 119/455 |

FOREIGN PATENT DOCUMENTS

EP   1 062 868 A1 * 12/2000

* cited by examiner

*Primary Examiner* — T. Nguyen
(74) *Attorney, Agent, or Firm* — Stites & Harbison PLLC; Nicolo Davidson

(57) ABSTRACT

Embodiments of the invention include methods and apparatuses relating to animal specimen collection and animal specimen collection stations. In an embodiment, multiple chambers each contain a single animal, and wells on a removable floor on each of the chambers may collect animal specimens. The wells may be dimensioned with a depth and width such that the animals may not disturb, contact, or contaminate specimens contained within a well.

16 Claims, 4 Drawing Sheets

COLLECTION STATION FOR ACCELERATED COLLECTION OF SPECIMENS FROM LABORATORY ANIMALS

CROSS-REFERENCE TO RELATED APPLICATIONS

This application claims benefit of U.S. Provisional Application App. No. 61/319,714 filed Mar. 31, 2010, the content of which is incorporated herein in its entirety by this reference.

GENERAL FIELD OF THE INVENTION

The present invention generally relates to the field of animal specimen collection. More specifically, the subject matter relates to a laboratory animal urine and feces collection station.

BACKGROUND

Urinalysis is one of the most informatory and commonly performed laboratory tests available to practicing veterinarians and scientific investigators. Non-contaminated animal urine collection is very challenging, especially with small rodents, the primary mammalian species comprising a majority of all experimental mammals among all animals used in research, teaching and testing. Express urinalysis in spot urine (10-200 µl) includes the measurement of urinary protein, bilirubin, haemoglobin, ketons, urobilinogen, and creatinine. The method of urine collection must address the following criteria: obtaining non-contaminated pure urine; low time and labor consuming technique; non-invasive and painless sample collection, high throughput.

SUMMARY OF THE INVENTION

Embodiments of the present invention greatly accelerate the process of simultaneous specimen collection from multiple small animals for veterinary and research purposes, for example, in big animal facilities and during labor consuming research. It increases the output in sample collection and thus enhances the productivity of specimen analysis in research, veterinary care, and the like.

Additionally, embodiments of the present invention are generally applicable in the renal, biochemical, pharmacokinetic, nutritional, urological, metabolic, toxicological, general behavioral, physiological, characterization of mouse lineage, and more experimental studies, as well as in clinical veterinary application requiring collection of urine (or feces) from the small animals.

Embodiments may allow for collection of urine samples in a noninvasive and painless manner. Embodiments may also allow for urine sample collection with minimal to no human supervision, thus increasing collection efficiency and reducing laboratory and other costs.

BRIEF DESCRIPTION OF THE FIGURES

The following figures of embodiments are examples, rather than limitations, are not drawn to scale, and references may indicate similar elements and in which.

DESCRIPTION OF THE INVENTION

Figure 1:
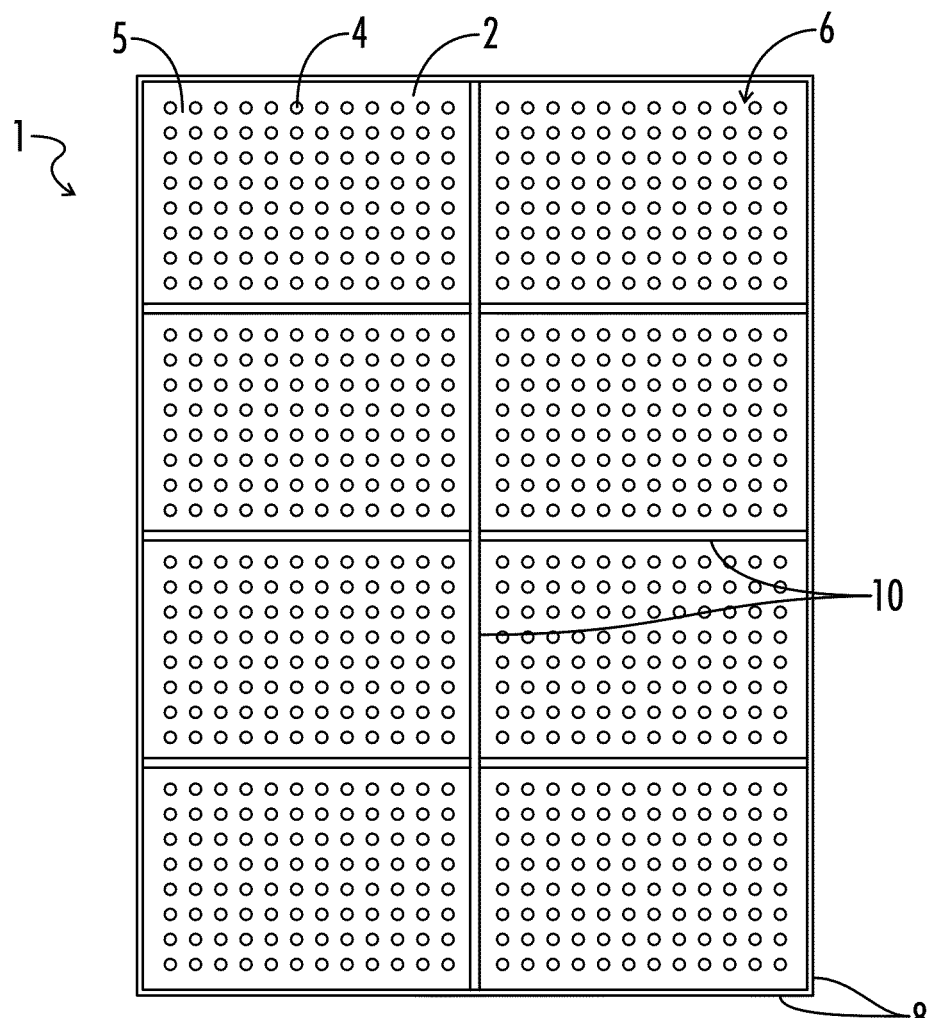
FIG. 1 illustrates a top view of a collection station apparatus without a top lid in accordance with one embodiment of the present invention.

All existing methods of spot urine collection are designed for a single animal, and most of them are invasive, slow, and difficult to execute. There is a great demand for non-invasive, easy, and fast spot urine collection in commercial and non-commercial animal facilities and laboratories to monitor the general health and physiologic status of small animals including rodents, and to perform basic and genetic research with multiple animals simultaneously for big animal facilities or genetics experiments.

The claimed collection station is a collection device that remedies the problems of the prior art. For example, the collection device of the present invention allows for spot urine collection into a well of a multi-well collection floor.

In embodiments of the collection station, the collection floor can be a microtiter plate, which are also known as a microwell plate or microplate. A microtiter plate is typically a flat plate with multiple "wells" that may be used as small test tubes. Microtiter plates may include, but are not limited to, 6, 12, 24, 48, 96, 384, or 1536 wells arranged in a matrix.

In embodiments of the present invention, the collection floor forms a removable bottom of the chamber. Embodiments with multi-chamber modules, i.e., multiple compartments, allow for the simultaneous collection of spot urine without intervention from multiple single-caged animals.

In other embodiments, the collection floor supports the animal. Roaming animals may not disturb urine and feces randomly collected on the bottom of the wells of the plate. The animal may be removed and transferred to its housing cage without disturbing the collected specimens.

The present invention has many advantages when compared with known non-invasive multiple animal methods (MAM) for urine collection and the only closest urine collection station (UCS) prototype proposed by Kurien and Scofield (Laboratory Animals 33, 83-86, 1999). MAM is based on the separation of up to 7 animals by cardboard laid out on plastic wrap outside an animal cage, and only allows a single mouse to urinate on plastic wrap.

Unlike previous known methods, the claimed collection station does not require the constant presence and monitoring by research personnel for urine and feces collection. The prior art methods typically require immediate removal of an animal from the corral to avoid urine contamination by feces and/or spreading the urine through the wrap by the roaming animal.

Additionally the claimed collection station is advantageous when compared to the prior art in part because the collection trays may be re-usable.

Additionally, the claimed collection station may be adapted to be transferable and usable with standardized cage racks in animal facilities or may be used on a laboratory bench with or without a hood. Contrarily, many prior art processes require that the procedure to be done under a hood to prevent environmental and biological cross-contamination.

Further, to avoid oxidative, enzymatic and bacterial degradation of unstable compounds in mouse urine within pharmacokinetic and metabolic studies the collection plates of certain embodiments may be easily placed on ice or any other cooling source during the collection time. Prior art procedures require that all procedure to be done at room temperature because of poor insulation and the associated of the experimental animals becoming hypothermic.

Embodiments of the present invention may also be suitable for parasitology control and studies that require feces specimens to be individually collected from each animal in the expanded rodent colony.

Embodiments of the claimed collection station may also be designed as multi-chambered collection stations. Multi-chambered collection stations may be assembled for simultaneous collection of spot urine from multiple single-caged small animals. For example, two UCS modules may allow a single researcher to collect urine samples from 40 healthy mice in 2 hours. Therefore, the claimed apparatuses and methods address the following performance criteria: non-invasive and painless technique; obtaining non-contaminated pure urine; ease and convenient sample collection.

Looking now to FIGS. 1-8, several different embodiments are shown. In FIG. 1 a top view of a collection station 1 is shown. The embodiment in FIG. 1 comprises eight chambers 6 joined together as one collection station 1. The chambers may be made of any suitable material, including those that may be sterilized, including metal, plexiglass, plastic, polystyrene, polypropylene, polycarbonate, and the like. FIG. 1 depicts how when multiple chambers 6 are united, the walls of each chamber may form either inner walls 10 or outer walls 8. Furthermore, FIG. 1 depicts the specimen collection floors 2 as well as the floor surface 5 and wells 4 of the specimen collection floors 2.

A specimen collection floor 2 may be any object that comprises one or more wells 4 that may collect specimens and a floor surface 5. Embodiments of specimen collection floors 2 may have wells 4 that are configured and dimensioned of such a width and depth that an animal placed on a specimen collection floor 2 may only contact the floor surface 5 and may be unable to disturb, touch, and/or contaminate any specimens contained within the wells 4. Note that the floor surface 5 may not be a continuous surface in all embodiments. In certain embodiments, a specimen collection floor 2 may comprise a 96-well microtiter plate.

Figure 2:
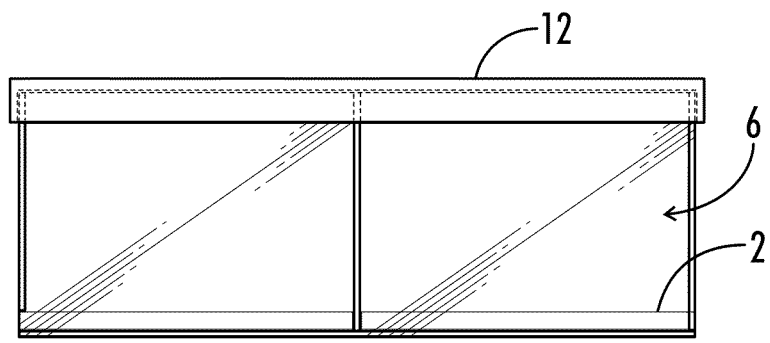
FIG. 2 illustrates a cross-sectional view of a collection station apparatus in accordance with one embodiment of the present invention.

FIG. 2 depicts an embodiment when viewed from the side. The embodiment in FIG. 2 comprises chambers 6, specimen collection floors 2, and a lid 12.

Figure 3:
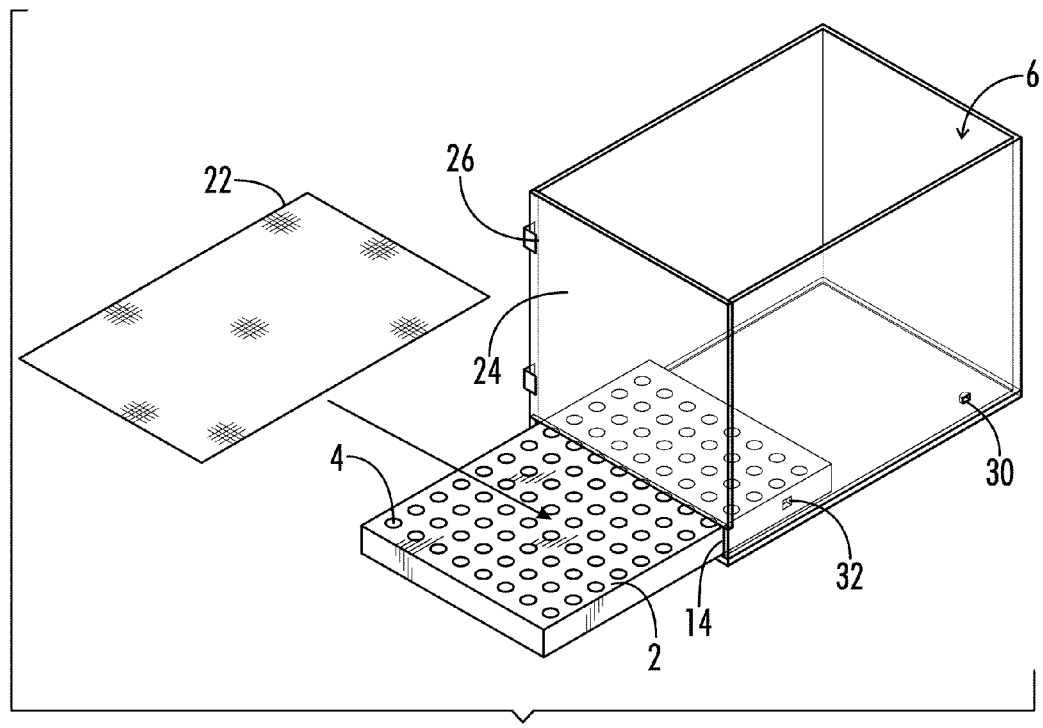
FIG. 3 illustrates a perspective view of a single chamber of a collection station apparatus without a top lid in accordance with one embodiment of the present invention.

Referencing FIG. 3, a perspective view of an embodiment is shown that comprises a chamber 6, a door 24, a specimen collection floor 2, a porous floor 22, a floor opening 14, and a lock mechanism 30, 32. The specimen collection floor 2 can be inserted and removed from the chamber 6 through a floor opening 14. Certain embodiments may have rails or grooves that assist and align the specimen collection floor 2 as it is inserted and removed from a chamber 6. The floor opening 14 may be designed so that an animal and/or contaminants cannot escape from the chamber 6 when the specimen collection floor 2 is inserted into the chamber 6. Also, a porous floor 22 may be located in the chamber 6 above the specimen collection floor 6 so that the specimen collection floor 2 may be removed and inserted into the chamber 6 without disrupting an animal housed within that chamber 6.

FIG. 3 also depicts a locking mechanism 30, 32 and a door mechanism 24, 26. The locking mechanism may comprise a detent 30 on the chamber 6 and a receiver 32 on the specimen collection floor 2. The result being that when the specimen collection floor 2 is inserted into the chamber 6, it may be locked in that position for easier handling of the collection station 1 as well as other benefits. Of course, the lock mechanism may be of any design to achieve desired results. Also, the door mechanism may comprise a door 24 attached to the chamber 6 with hinges 26. Other door 24 mechanisms may designed in any manner that may achieve desired results.

Figure 4:
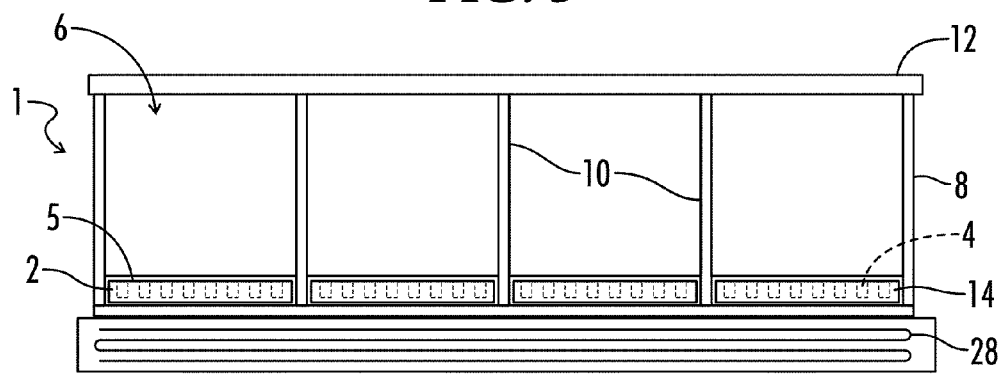
FIG. 4 illustrates a side view of a collection station apparatus with a top lid and placed on a cooling source in accordance with one embodiment of the present invention.

Turning to FIG. 4, a frontal perspective view of an embodiment of the collection station 1 is shown with a lid 12 attached. The embodiment comprises specimen collection floors 2, chambers 6, and a lid 12. Furthermore, the figure depicts how the collection station 1 may be placed on or feel the effects of a cooling source 28 from the bottom side of the collection station 1. The cooling source 28 may be embodied in any suitable form, including ice, cooled air, and the like. Embodiments may have specimen collection floors 2 act as an insulator between the chamber 6 and the cooling source 28. With such a design, embodiments may cool specimens within the wells 4 to preserve the specimens while avoiding overly cooling the floor surface 5 and/or chamber 6 and making the animal uncomfortable, suffer pain, or even become hypothermic.

Figure 5:
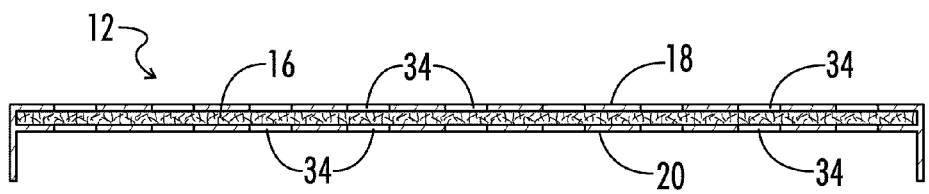
FIG. 5 illustrates a cross-sectional view of a lid to a collection station apparatus in accordance with one embodiment of the present invention.

Referencing FIG. 5, a cross sectional view of a specific embodiment of a lid 12 is illustrated. The lid 12 may be of any material or dimension necessary to ensure that an animal may be securely and safely enclosed within a chamber 6. Embodiments of lids 12 may be breathable. The lid 12 may comprise three layers including a bottom supporting breathable layer 20, a top breathable layer 18, and a filter material 16. The top 18 and bottom 20 layers may be breathable due to holes 34 drilled through both layers. The top 18 and bottom 20 layers may be constructed of any suitable material, such as metal, plastic, and the like. A lid 12 comprising a filter material 16 may be constructed in any manner to meet the limitations of a particular application. That said, the lid 12 embodiment depicted in FIG. 5 may allow for air to pass through the lid 12 while also reducing the flow of contaminants in and out of the chambers 6.

The following Example has been included to illustrate modes/embodiments of the presently disclosed subject matter. In light of the present disclosure and the general level of skill in the art, those of skill will appreciate that the following is intended to be exemplary only and that numerous changes, modifications, and alterations can be employed without departing from the scope of the presently disclosed subject matter.

EXAMPLE

We performed a phenotype-driven screening for proteinuria in hundreds of mice by a collecting spot urine up to 15 times from each animal during their life time using a cage with removable bottoms. The removable bottoms were 96-well microtiter plates. The length and width of the cage corresponded to the size of microtiter plate and the bottom of the cage had slots allowing for the easy insertion and removal of microtiter plates. Cages used in this example were both used individually and assembled in a multi-cage module, termed urine collection station (UCS). A transferable UCS is a animal caging module fabricated from clear Plexiglas, each 14.6 in. long, 10.03 in. wide and 5.25 in. high. The UCS module is suitable for installation on a standard cage rack and provides for the collection of urine samples from up to 8 small animals simultaneously. For example, mice were placed into individual compartments with removable 96-wells plates laid down on the bottom of the each compartment. The UCS' upper opening is covered with a breathable lid fabricated from a metal frame inclosing a filtered material (FP191ONH, ANCARE Corp., Bellmore, N.Y.) to provide filtered air ventilation and to prevent environmental and biological cross-contamination. Healthy or diseased mice placed within the compartments produced 10 to 250 µl of urine during a time period of 10 sec to 1 hour. Urine and feces randomly accumulated in the different wells of the plates and stayed there undisturbed by the roaming animals until the collection was completed. When collection was finished, the 96-well plates were removed and voided pure urine samples were aspirated into microcentrifuge tubes for urinalysis by micropipettes.

Figure 6:
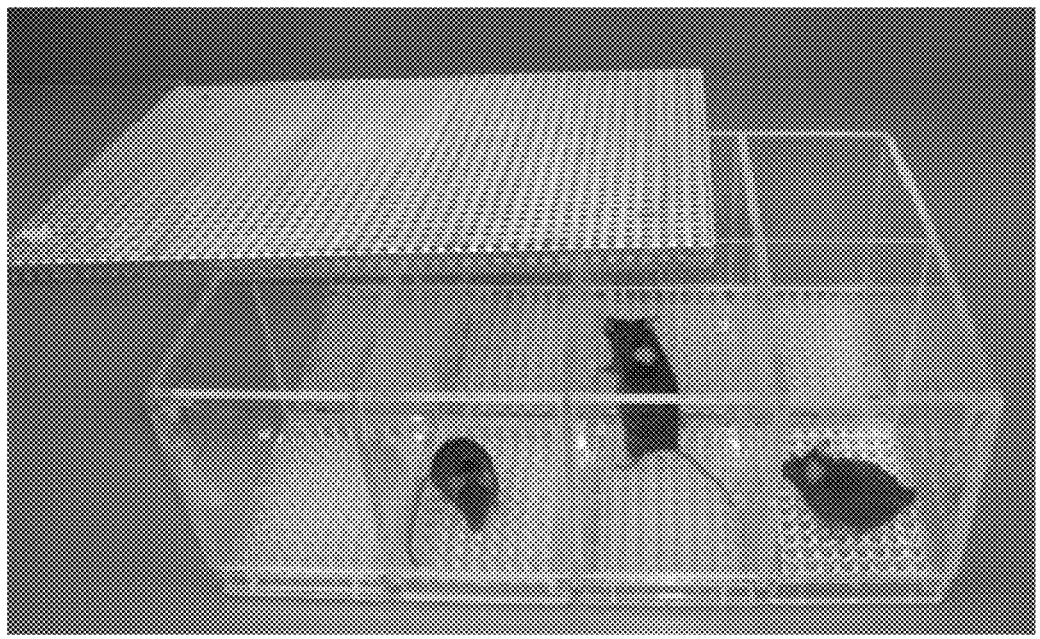
FIG. 6 illustrates a photograph of a collection station apparatus containing animals in accordance with one embodiment of the present invention.
Figure 7:
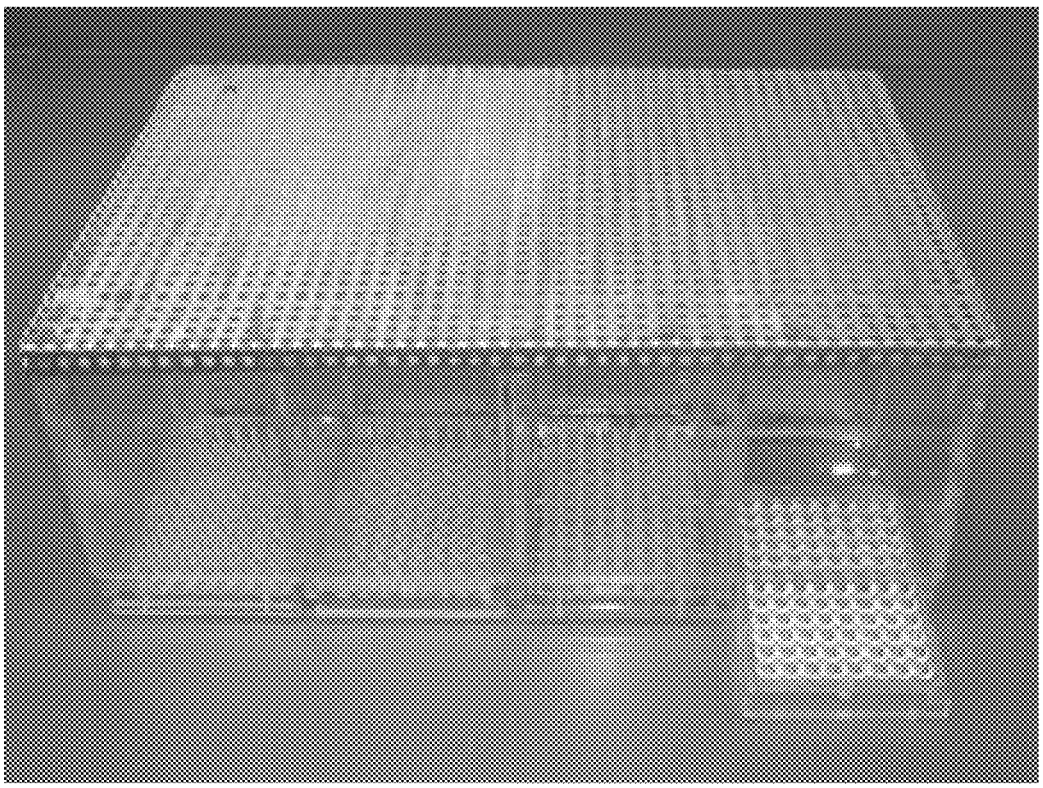
FIG. 7 illustrates a photograph of a collection station apparatus containing animals in accordance with one embodiment of the present invention.
Figure 8:
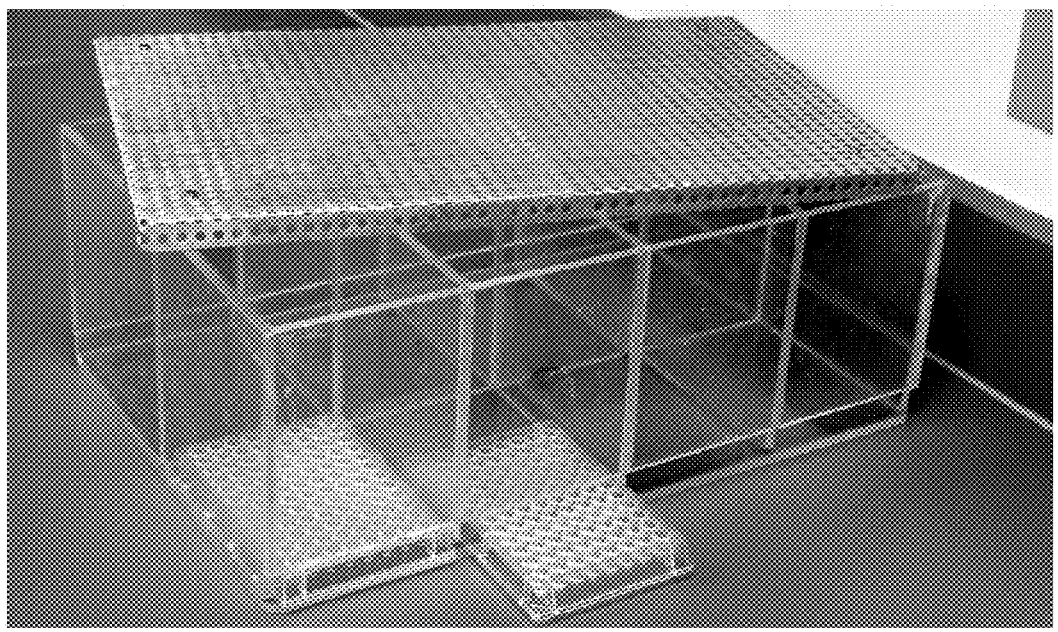
FIG. 8 illustrates a photograph of a collection station apparatus in accordance with one embodiment of the present invention.

The embodiment used for this Example 1 are illustrated in the photographs of FIGS. 6-8.

The invention thus being described, one of ordinary skill in the art will recognize that modifications and variations are possible without departing from the teachings of the presently-disclosed subject matter. This description, and particularly the specific details of the exemplary embodiments disclosed, is provided primarily for clearness of understanding and no unnecessary limitations are to be understood therefrom, for modifications and other embodiments will become evident to those skilled in the art upon reading this disclosure and may be made without departing from the spirit or scope of the claimed subject matter. Also, all depicted elements may be combined or modified in any suitable manner, and that certain structures and components well known in the art may be lacking in this description. Therefore, the invention should not be limited by the above described embodiments, but should be construed broadly in a manner consistent with the scope of the invention.

What is claimed is:

1. An apparatus for animal specimen collection, comprising:
   at least one animal chamber that is enclosed by vertically extending walls;
   a specimen collection floor removably received by the chamber;
   a floor surface defining a top surface of the specimen collection floor; and
   a plurality of individually defined wells arranged on the top surface of the specimen collection floor, each of the plurality of wells including a top opening for receiving an animal specimen and a closed cavity for containing the animal specimen separate from the other of the plurality of wells.

2. The apparatus of claim 1, wherein the apparatus is constructed of materials including polystyrene, pelixglass, polycarbonate, polypropylene, a polymer, or metal.

3. The apparatus of claim 1, wherein the animal specimens include urine and feces.

4. The apparatus of claim 1, further comprising:
   a lid configured to couple to a top surface of the apparatus.

5. The apparatus of claim 4, wherein the lid further comprises:
   a breathable filter.

6. The apparatus of claim 1, wherein the specimen collection floor is a microtiter plate.

7. The apparatus of claim 1, wherein the wells are dimensioned of such a width and depth so the animal cannot contaminate or disturb the specimens in the wells.

8. The apparatus of claim 1, wherein the wells have a volume of 10-400 µl.

9. The apparatus of claim 1, wherein the chamber further comprises:
   a door.

10. The apparatus of claim 1, wherein the chamber further comprises:
    a porous floor located above the specimen collection floor when the specimen collection floor is coupled to the chamber.

11. The apparatus of claim 1, wherein the chamber further comprises:
    a floor opening at a bottom end of one of the vertically extending walls, the floor opening configured to receive the specimen collection floor.

12. The apparatus of claim 11, wherein the floor opening further comprises:
    a lock to hold the specimen collection floor in a set position relative to the chamber.

13. The apparatus of claim 1, further comprising:
    one or more grooves on the chamber, wherein the specimen collection floor may follow the grooves when received by the chamber.

14. The apparatus of claim 1, wherein a bottom of the apparatus is configured to contact a cooling source, and the cooling source cools the specimen in the well to a first temperature and the floor surface to a second temperature, and wherein the first temperature is lower than the second temperature.

15. An apparatus for laboratory animal specimen collection, comprising:
    a plurality of modules that include four sides;
    removable specimen collection floors coupled to each module, wherein the specimen collection floors include a plurality of individually defined wells that each include a top opening for receiving an animal specimen and a closed cavity for containing the animal specimen separate from the other of the plurality of wells; and
    a breathable lid.

16. The apparatus of claim 15, wherein the lid includes a breathable support layer, a filter layer, and a breathable top layer.

* * * * *